United States Patent
Prince et al.

(10) Patent No.: US 9,290,645 B2
(45) Date of Patent: Mar. 22, 2016

(54) CYCLE TIME REDUCTION MASTERBATCHES AND THEIR USE IN THERMOPLASTIC COMPOUNDS

(75) Inventors: Jack R. Prince, West Bountiful, UT (US); Jason D. Piunti, Cedarburg, WI (US)

(73) Assignees: PolyOne Corporation, Avon Lake, OH (US); Revolutionary Plastics, LLC, Las Vegas, NV (US)

( * ) Notice: Subject to any disclaimer, the term of this patent is extended or adjusted under 35 U.S.C. 154(b) by 112 days.

(21) Appl. No.: 14/002,629

(22) PCT Filed: Mar. 1, 2012

(86) PCT No.: PCT/US2012/027277
§ 371 (c)(1),
(2), (4) Date: Aug. 30, 2013

(87) PCT Pub. No.: WO2012/121970
PCT Pub. Date: Sep. 13, 2012

(65) Prior Publication Data
US 2014/0151924 A1 Jun. 5, 2014

Related U.S. Application Data

(60) Provisional application No. 61/449,613, filed on Mar. 4, 2011.

(51) Int. Cl.
| | |
|---|---|
| *B29C 45/00* | (2006.01) |
| *C08L 23/06* | (2006.01) |
| *B29C 47/00* | (2006.01) |
| *C08J 3/22* | (2006.01) |
| *G06N 3/08* | (2006.01) |
| *B29C 43/24* | (2006.01) |

(52) U.S. Cl.
CPC ............... *C08L 23/06* (2013.01); *B29C 43/24* (2013.01); *B29C 45/0013* (2013.01); *B29C 47/0004* (2013.01); *B29C 47/0038* (2013.01); *C08J 3/226* (2013.01); *G06N 3/08* (2013.01); *B29C 47/0009* (2013.01); *B29C 47/0019* (2013.01); *B29C 47/0021* (2013.01); *B29C 47/0023* (2013.01)

(58) Field of Classification Search
None
See application file for complete search history.

(56) References Cited

U.S. PATENT DOCUMENTS

| | | | |
|---|---|---|---|
| 3,981,840 | A | 9/1976 | Yamamoto et al. |
| 4,243,575 | A | 1/1981 | Myers et al. |
| 4,661,533 | A | 4/1987 | Stobby |
| 4,968,463 | A | 11/1990 | Levasseur |
| 5,177,139 | A | 1/1993 | Klaar et al. |
| 5,302,634 | A | 4/1994 | Mushovic |
| 5,366,365 | A | 11/1994 | Sullivan et al. |
| 5,369,147 | A | 11/1994 | Mushovic |
| 5,508,315 | A | 4/1996 | Mushovic |
| 5,552,455 | A | 9/1996 | Schuler et al. |
| 5,604,266 | A | 2/1997 | Mushovic |
| 6,242,098 | B1 | 6/2001 | Styron et al. |
| 6,269,952 | B1 | 8/2001 | Watt et al. |
| 6,344,268 | B1 | 2/2002 | Stucky et al. |
| 6,362,252 | B1 | 3/2002 | Prutkin |
| 6,379,797 | B1 | 4/2002 | Nikkeshi et al. |
| 6,583,217 | B1 | 6/2003 | Li et al. |
| 6,669,773 | B2 | 12/2003 | Malloy et al. |
| 6,916,863 | B2 | 7/2005 | Hemmings et al. |
| 6,995,202 | B2 | 2/2006 | Lake, Jr. et al. |
| 7,195,473 | B2 | 3/2007 | Sullivan et al. |
| 7,241,818 | B2 | 7/2007 | Hemmings et al. |
| 7,879,939 | B2 | 2/2011 | Prince et al. |
| 8,106,105 | B2 | 1/2012 | Cernohous |
| 2002/0016224 | A1 | 2/2002 | Pasqua et al. |
| 2002/0040084 | A1 | 4/2002 | Colmar et al. |
| 2002/0185769 | A1 | 12/2002 | Hasegawa et al. |
| 2003/0032707 | A1 | 2/2003 | Hemmings et al. |
| 2004/0144287 | A1 | 7/2004 | Tardif et al. |
| 2004/0266933 | A1 | 12/2004 | Friedman et al. |
| 2005/0163969 | A1* | 7/2005 | Brown ............... C08G 18/0895 428/151 |
| 2006/0099405 | A1 | 5/2006 | Guiselin et al. |
| 2008/0029925 | A1 | 2/2008 | Brown |
| 2008/0114112 | A1 | 5/2008 | Hemmings et al. |
| 2008/0119578 | A1* | 5/2008 | Prince et al. .................... 521/91 |
| 2008/0131344 | A1 | 6/2008 | Hill et al. |
| 2009/0258777 | A1 | 10/2009 | Tardif et al. |
| 2011/0071252 | A1 | 3/2011 | Prince et al. |
| 2011/0130501 | A1 | 6/2011 | Prince et al. |

(Continued)

FOREIGN PATENT DOCUMENTS

| | | |
|---|---|---|
| AU | 2009200846 | 9/2009 |
| CN | 1894322 | 1/2007 |

(Continued)

OTHER PUBLICATIONS

Electronic translation of JP 2005-068305.*

(Continued)

*Primary Examiner* — Jill Heitbrink
(74) *Attorney, Agent, or Firm* — John H. Hornickel; Thomas J. Rossa

(57) ABSTRACT

A masterbatch for a thermoplastic compound is disclosed, comprising fly ash and/or cinders and a carrier thermoplastic resin, compatible with or the same as the thermoplastic resin used in the compound. The amount of fly ash and/or cinders comprises at least 50 percent by weight of the masterbatch. Presence of the fly ash and/or cinders can reduce cycle time for molding of the compound into a plastic article by from about 5 percent to about 30 percent merely because of the presence of the fly ash and/or cinders.

12 Claims, No Drawings

(56) References Cited

U.S. PATENT DOCUMENTS

2011/0144243 A1 6/2011 Prince et al.
2011/0178198 A1 7/2011 Backer et al.

FOREIGN PATENT DOCUMENTS

| CN | 101189292 | | 5/2008 |
|---|---|---|---|
| EP | 0640650 | | 3/1995 |
| EP | 0948410 | | 10/1999 |
| GB | 2478696 | | 9/2011 |
| JP | 2001261921 | | 9/2001 |
| JP | 2001302809 | | 10/2001 |
| JP | 2005-068305 | * | 3/2005 |
| WO | 99/37592 | * | 7/1999 |
| WO | WO9937592 | | 7/1999 |
| WO | WO 2008005143 | | 1/2008 |
| WO | WO 2009136185 | | 11/2009 |
| WO | WO2009136185 | | 11/2009 |
| WO | WO 2011037865 | | 3/2011 |
| WO | WO 2012121970 | | 9/2012 |
| WO | WO 2013043454 | | 3/2013 |

OTHER PUBLICATIONS

Huang et al. "Processed Low NOx Fly Ash as a Filler in Plastics" Journal of Minerals & Materials Characterization & Engineering, vol. 2, No. 1, pp. 11-31, 2003.
Chemistry & Industry (London, United Kingdom) (2010), (5), 24-26.
Deepthi et al. "Mechanical and thermal characteristics of high density polyethylene-fly ash cenospheres composites" Material and Design. vol. 31, pp. 2051-2060 (Oct. 2009).
ASTM D1238—10 Standard Test Method for Melt Flow Rates of Thermoplastics by Extrusion Plastometer—http://www.astm.org/Standards/D1238.htm, (4 pgs) (Date Unknown).
Barnes et al., "Ash Utilisation from Coal-Based Power Plants," UK Department of Trade and Industry commissioned study, Jan. 2006 (30 pgs).
Berghahn, M., "Smart fly ash solutions," Evonik Industries, Science-to-Business Center Eco2, Eurocoalash May 28, 2010 (20 pgs).
Brennan, P., "Processing of Fly Ash—New Developments," Eurocoalash 2010, Copenhagen—May 28, 2010, Evonik Industries (Part 1—10 pgs).
Brennan, P., "Processing of Fly Ash—New Developments," Eurocoalash 2010, Copenhagen—May 28, 2010, Evonik Industries (Part 2—10 pgs).
Brennan, P., "Processing of Fly Ash—New Developments," Eurocoalash 2010, Copenhagen—May 28, 2010, Evonik Industries (Part 3—9 pgs).
Eurocoalash Conferences 2008 and 2010, downloaded from http://www.ecoba.com/eurocoalash.html, May 2, 2011 (1 pg).
Fujimo et al., "Experimental Investigation on the Thermal Conductivity Measurement of the Fly Ash Dispersed Plastic Composite Using Guarded Hot Plate Apparatus", 2007.
Heat Transfer—Japanese Research, vol. 36 Issue 7, Oct. 17, 2007, Wiley Periodicals, 3 Abstracts (3 pgs).
Nath et al., "Novel Observations on Kinetics of Nonisothermal Crystallization in Fly Ash Filled Isotactic-Polypropylene Composites", Published online Oct. 7, 2009 in Wiley.

Polyolefin Wikipedia Article (2 pgs) http://en.wikipedia.org/wiki/Polyolefin, May 2, 2011 last modified on Wikipedia.
RockTron Story, downloaded from http://rktron.com/company-history, Apr. 30, 2011 (2 pgs).
RockTron Legal Information, downloaded from http://rktron.com/legal-information, May 2, 2011 (2 pgs).
The RockTron Management Team, downloaded from http://rktron.com/management-team-2, Apr. 30, 2011(1 pg).
RockTron Collaboration & Innovation, downloaded from http://rktron.com/r-d-collaboration, Apr. 30, 2011 (1 pg).
RockTron Product Ranges, downloaded from http://rktron.com/products, Apr. 30, 2011 (2 pgs).
RockTron Technology Overview, IGEM 2010 (Part 1—20 pgs).
RockTron Technology Overview, IGEM 2010 (Part 2—20 pgs).
RockTron Technology Overview, IGEM 2010 (Part 3—20 pgs).
RockTron Technology Overview, IGEM 2010 (Part 4—18 pgs).
RockTron Technology Overview Presentation Slides, IGEM 2010 (78 pages) (Date Unknown).
Schut, "Fly-Ash Fille Stages a Comeback" Article, Plastics Technology, Sep. 1999 Issue (2 pgs).
A. Brent Strong, "Plastics Materials and Processing", Third Edition, (21 pgs), 3rd Edition, Copyright 2006.
A. Brent Strong, "Fundamentals of Composites Manufacturing Materials, Methods, and Applications", Second Edition, (4 pgs) 2nd Edition, Copyright 1996.
Wong & Truss "Effect of Flyash Content and Coupling Agent on the Mechanical Properties of Flyash-Filled Polypropylene", Composites Science and Technology 52 (1994), 361-368.
Xanthos, "Functional Fillers for Plastics", Wiley-VCH Verlag GmbH & Co. KGaA, (89 pgs), Copyright 2005.
Chinese Office Action issued in related application No. 201180037024.9, dated Nov. 18, 2013 (4 pgs).
Chinese Office Action and translation submitted by the State Intellectual Property Office, issued on Apr. 15, 2010 (12 pgs).
Chinese Office Action and translation submitted by the State Intellectual Property Office, issued on Dec. 16, 2010 (7 pgs).
Chinese Office Action and translation submitted by the State Intellectual Property Office, issued on Mar. 16, 2011 (8 pgs).
Chinese Office Action and translation submitted by the State Intellectual Property Office, issued on Apr. 27, 2011 (10 pgs).
European Search Report issued in related application No. 11827112.1, dated Nov. 7, 2013 (7 pgs).
PCT Int Search Report and Written Opinion issued in PCT/US2012/055065, date of mailing Mar. 27, 2013 (10 pgs).
PCT Int Search Report and Written Opinion dated Dec. 28, 2012, issued in PCT/US2012/039697 (15 pgs).
PCT International Preliminary Report on Patentability, date of mailing, Aug. 16, 2007 (4 pgs).
PCT International Preliminary Report on Patentability issued in related application No. PCT/US2012/039697, dated Dec. 12, 2013 (7 pgs).
PCT Int Search Report and Written Opinion issued in PCT/US2012/066641, date of mailing Feb. 19, 2013 (12 pgs).
International Preliminary Report on Patentability issued in corresponding application No. PCT/US2012/066641, dated Jun. 3, 2014 (9 pgs).

* cited by examiner

CYCLE TIME REDUCTION MASTERBATCHES AND THEIR USE IN THERMOPLASTIC COMPOUNDS

CLAIM OF PRIORITY

This application claims priority from U.S. Provisional Patent Application Ser. No. 61/449,613 and filed on Mar. 4, 2011, which is incorporated by reference.

FIELD OF THE INVENTION

This invention relates to use of a master batch to deliver a functional filler of fly ash and/or cinders into plastic articles made of thermoplastic compounds.

BACKGROUND OF THE INVENTION

Fly ash and cinders are by-products of combustion. Fly ash and cinders can be separated into specific particle sizes. Revolutionary Plastics, LLC is a supplier of fly ash and cinders having specific particles sizes and the owner of U.S. Pat. No. 7,879,939 (Prince et al.), which is incorporated by reference as if fully rewritten herein.

Prince et al. discloses preparation of fully formulated thermoplastic compounds, such as identified in Table 1, in which the fly ash and/or cinders component constitutes 1-40 weight percent of the compound for a foamed article and in which the fly ash and/or cinders component can constitute 1-70 weight percent of the compound for an un-foamed article.

SUMMARY OF THE INVENTION

What is needed is a functional filler for polymer compounds that reduces cycle time of molding operations and reduces unit production costs but maintains physical properties of the unfilled plastic compound.

As explained by Prince et al., fly ash and/or cinders can be an excellent functional filler for all the reasons described therein. But fly ash and cinders can also be abrasive, and without special handling equipment and care during manufacture, conventional compounding equipment handling fly ash and cinders particulates can become worn more quickly.

Therefore, what is especially needed is a masterbatch to introduce the functional fly ash and/or cinders filler in a pelletized form at the time of molding, extruding, or calendering to shape the final plastic article. Fly ash and/or cinders particulate is not suitable for molding equipment, especially injection molding equipment.

The present invention solves these problems by providing a masterbatch comprising functional filler of any of (a) fly ash, (b) cinders, or (c) fly ash and cinders, which functional filler can be used to reduce molding cycle time or extruding or calendering throughput without loss of physical properties of the polymer compound. Also the fly ash and/or cinders, products of combustion, are consumed in a sustainable manner.

One aspect of the invention is a masterbatch for a thermoplastic compound having a first thermoplastic resin, comprising (a) fly ash and/or cinders and (b) a second thermoplastic resin, compatible with or the same as the first thermoplastic resin, to serve as a carrier for the fly ash and/or cinders, wherein the fly ash and/or cinders comprises at least 50 percent by weight of the masterbatch.

Another aspect of the invention is a method of using the masterbatch identified in the paragraph above.

The following embodiments explain some attributes of the invention.

EMBODIMENTS OF THE INVENTION

Thermoplastic Resins for Polymer Compounds

Any thermoplastic resin is a candidate for use with fly ash and/or cinders according of the invention. Non-limiting examples of large volume commercial thermoplastic resins include polyolefins, polyamides, polyesters, poly(meth)acrylates, polycarbonates, poly(vinyl halides), polyvinyl alcohols, polynitriles, polyacetals, polyimides, polyarylketones, polyetherketones, polyhydroxyalkanoates, polycaprolactones, polystyrenes, polyurethanes, polysulfones, polyphenylene oxides, polyphenylene sulfides, polyacetates, liquid crystal polymers, fluoropolymers, ionomeric polymers, and copolymers of any of them and combinations of any two or more of them.

Published literature exists to identify many commercial species of these categories of thermoplastic resins. Non-limiting examples of specific commercial thermoplastic resins include acrylonitrile butadiene styrene (ABS), polymethyl methacrylate (PMMA), cellulose acetate, cyclic olefin copolymer (COC), ethylene-vinyl acetate (EVA), ethylene vinyl alcohol (EVOH), polytetrafluoroethane (PTFE), ionomers, polyoxymethylene (POM or Acetal), polyacrylonitrile (PAN), polyamide 6, polyamide 6,6, polyamide-imide (PAI), polyaryletherketone (PAEK), polybutadiene (PBD), polybutylene (PB), polybutylene terephthalate (PBT), polycaprolactone (PCL), polychlorotrifluoroethylene (PCTFE), polyethylene terephthalate (PET), polycyclohexylene dimethylene terephthalate (PCT), polycarbonate (PC), polyhydroxybutyrate (PHB), polyethylene (PE), polyetheretherketone (PEEK), polyetherketoneketone (PEKK), polyetherimide (PEI), polyethersulfone (PES), chlorinated polyethylene (CPE), polyimide (PI), polylactic acid (PLA), polymethylpentene (PMP), polyphenylene oxide (PPO), polyphenylene sulfide (PPS), polyphthalamide (PPA), polypropylene (PP), polysulfone (PSU), polytrimethylene terephthalate (PTT), polyurethane (PU), polyvinyl acetate (PVA), polyvinyl chloride (PVC), polyvinylidene chloride (PVDC), and styrene-acrylonitrile (SAN).

These specific thermoplastic resins can be substituted or unsubstituted and mixed in any combination suitable to any person having ordinary skill in the art.

The quality of the thermoplastic resin can be prime or reprocessed via recycling. The use of recycled thermoplastic resin further can reduce costs for the manufacturer and provides additional sustainable solutions for the environment.

Functional Filler

As used herein, "fly ash and/or cinders" means that the functional filler can be selected from the group consisting of fly ash, cinders, and both fly ash and cinders.

Fly ash and/or cinders are by-products of coal combustion and have been found in this invention to be an unexpectedly valuable filler to perform the function of reducing of molding cycle times without loss of physical properties. Fly ash useful in this invention is registered as CAS No. 71243-67-9.

Stated most generally, fly ash constitutes a multiplicity of spheres of a mineral composite formed during coal combustion. Stated most generally, cinders are other residue particulates formed during coal combustion, such as fused or vitrified matter. Preferred grades of fly ash and/or cinders have been processed to result in the following properties: a melting point or greater than about 1090° C.; a specific gravity of from about 2.2 to about 2.8; less than 100 parts per million of lead, hexavalent chromium, mercury or cadmium, a moisture content of 1% or less; a polycyclic aromatic hydrocarbon content of less than about 200 parts per million; a crystalline silica content of below about 0.5%; and a particle size range in which about 85% of the particles fall within 0.2 μm-280 μm, and remainder are less than about 850 μm.

Fly ash and/or cinders of a variety of grades and treatments can be purchased from Revolutionary Plastics LLC of Las Vegas, Nev.

Optional Additives

The masterbatch of the present invention can include conventional plastics additives in an amount that is sufficient to obtain a desired processing or performance property for the masterbatch or the final molded, extruded, or calendered compound. The amount of additive(s) should not be wasteful of the additive nor detrimental to the processing or performance of the compound. Those skilled in the art of thermoplastics compounding, without undue experimentation but with reference to such treatises as Plastics Additives Database (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppresants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Masterbatch Production

It has been found that it is possible to load a high percentage of fly ash and/or cinders into a carrier plastic resin to make a masterbatch. Consequently, it is possible for the fly ash and/or cinders to be prepared into the form of a masterbatch with weight percent of the fly ash and/or cinders being at least 50 percent, desirably from about 72 to about 90 percent, and preferably from about 75 to about 85 percent by weight of the masterbatch. Indeed, the weight percent of fly ash and/or cinders desirably can be any percentage between 72 and 90 percent, stated in any range of two percents within that range. The carrier for the fly ash and/or cinders in the form of a masterbatch can be any plastic resin which is compatible with the plastic resin into which the masterbatch will be added, including any of the thermoplastic polymers identified above. Currently, linear low density polyethylene (LLDPE) or medium density polyethylene (MDPE) are identified as suitable carriers to make a masterbatch for use with polyolefin resins of the final thermoplastic compound.

Optionally, any of the additives identified above can be added to the masterbatch for later melt mixing with the plastic resin and other ingredients to be used to make the final plastic compound, whether molded, extruded, or calendered.

One can form the masterbatch using continuous or batch techniques, using extruders or mixers, respectively. Regardless of the manner of production, one having ordinary skill in the art should recognize that precautions may need to be taken against unnecessary wear of the equipment caused by the ceramic nature of the fly ash and/or cinders. Specialized surfaces can be used in those parts of the equipment against the fly ash and/or cinders particulate contacts when making the masterbatch. It has been found that once into the form of a masterbatch, the possibility of undue wear and tear on production molding or extruding equipment can be reduced, placing the care of equipment more upon the processor of the masterbatch and less on the purchaser of the masterbatch for subsequent compounding and final article formation.

The preparation of compounded pellets of fully let-down compound is explained in U.S. Pat. No. 7,879,939 (Prince et al.). The techniques described in Prince et al. can be used with fly ash and/or cinders in higher concentrations, in order to make the masterbatch.

Alternatively to what is explained in Prince et al., mixing in a continuous process typically occurs in an extruder that is elevated to a temperature that is sufficient to melt the polymer matrix with addition either at the head of the extruder or downstream in the extruder of the solid ingredient additives. Extruder speeds can range from about 50 to about 500 revolutions per minute (rpm), and preferably from about 100 to about 300 rpm. Typically, the output from the extruder is pelletized for later extrusion, molding, or calendering into polymeric articles.

Alternatively to what is explained in Prince et al., mixing in a batch process typically occurs in a Banbury or other batch mixer that is also elevated to a temperature that is sufficient to melt the polymer matrix to permit addition of the solid ingredient additives. The mixing speeds range from 60 to 1000 rpm. Also, the output from the mixer is chopped into smaller sizes for later extrusion, molding, or calendering into polymeric articles.

Masterbatches of carrier resin and fly ash and/or cinders can be purchased from PolyOne Corporation, as a distributor of Revolutionary Plastics, under the brand of Nano P.E.A.™ nano-sized polymer enhancing agent.

Commercial grades of these masterbatches can have from about 73 to about 85 weight percent of fly ash and/or cinders to the weight of the masterbatch, desirably 74 to 81 weight percent, and preferably 75 to 80 weight percent. The melt flow rate can range from about 5 to about 9 and preferably from about 5 to about 7 g/10 min. Moisture can range from about 100 to about 1000 ppm. The specific gravity can range from about 1.6 to about 1.8 and preferably from about 1.74 to about 1.78. The masterbatches are typically cut into pellets in a diameter of from about 2.5 mm to about 3.8 mm. A presently preferred grade of Nano P.E.A. is LLH7506 concentrate, which uses about 25 weight percent MDPE as a carrier and has about 75 weight percent of fly ash and cinders.

Subsequent Processing

Let-down of the masterbatch of the invention into a plastic resin during subsequent steps of reshaping by extrusion, molding, or calendering depends on the amount of functional filler desired by a person having ordinary skill in the art, without undue experimentation. Processing begins with melt-mixing the masterbatch with the plastic resin followed by reshaping by extrusion, molding, or calendering, followed by natural or accelerated cooling to form the final plastic article desired.

In the case of molding, particularly injection molding, the reshaping step includes pressurized injecting, holding, and cooling steps before the plastic article is ejected, the cycle of which the time is being measured to determine cycle time. More specifically, the reshaping step comprises four substeps of (1) injecting the compound into a mold; (2) holding the compound in the mold to form the plastic article in the shape of the mold; (3) cooling the plastic article to permit the plastic article to be released from the mold while retaining shape of the mold; and (4) ejecting the plastic article. The time between commencement of the injecting substep (1) and commencement of the ejecting substep (4) is one cycle time, and the cycle time of the compound is reduced from about 5 percent to about 30 percent for a plastic article of the compound as compared with a cycle time between commencement of substep (1) and commencement substep (4) for a plastic article that only contains the plastic resin without the masterbatch present.

Depending on whether the plastic compound into which the masterbatch is let down is a final plastic article or a core section of the final plastic article, the amount of masterbatch can vary. The desire for reduction of cycle time may need to be balanced the desire for a particular surface appearance of the final plastic article. Therefore, generally, the amount of masterbatch in the final polymer compound can range from about 1 to about 65 and preferably from about 20 to about 40 weight percent. As such, the weight percent of the fly ash and/or cinders functional filler in the final polymer compound can range from about 1 to about 58, desirably from about 5 to about 44, and preferably from about 10 to about 32 weight percent.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

Masterbatches of the present invention mixed with thermoplastic resin can be molded, extruded, or calendered with surprising efficiency and result in plastic articles having excellent physical properties and appearance.

It is possible that molding cycle times can be reduced by from about 5 percent to about 30 percent and preferably at least about 14 percent merely because of the presence of the fly ash and/or cinders as functional fillers, all other factors being equal.

Moreover, it has been found that comparable physical properties to a more expensive mineral-filled polyamide compound can be obtained with a less expensive fly ash- and/or cinders-filled polypropylene compound.

The fly ash and/or cinders functional filler can replace as much as about 65% of the plastic resin without unacceptable loss of physical properties. With the cost of the fly ash and/or cinders possibly being less than the cost of the plastic resin being replaced, less expensive molded, extruded, or calendered plastic articles can be made, without unacceptable loss of physical properties or sacrifice of ultimate surface appearance.

Any number of plastic articles can be benefit from the use of fly ash and/or cinders in the preparation of the polymer compound. Non-limiting examples of final plastic articles which can benefit from the invention include appliances (refrigerators, freezers, washers, dryers, toasters, blenders, vacuum cleaners, coffee makers, mixers); building and construction articles (fences, decks and rails, floors, floor covering, pipes and fittings, siding, trim, windows, window shutters, doors, molding, plumbing products, toilet seats, and wall coverings); consumer goods (power hand tools, rakes, shovels, lawn mowers, shoes, boots, golf clubs, fishing poles, and watercraft); electrical/electronic (printers, computer housings, business equipment, LCD projectors, mobile phones, connectors, chip trays, circuit breakers, and plugs); healthcare products (wheelchairs, beds, testing equipment, and packaging); industrial products (containers, bottles, drums, material handling, gears, bearings, gaskets and seals, valves, wind turbines, and safety equipment); packaging (food and beverage, cosmetic, detergents and cleaners, personal care, pharmaceutical and wellness); and transportation articles (automotive aftermarket parts, bumpers, window seals, instrument panels, consoles, under hood electrical, and engine covers).

A preferred means of using masterbatches of the invention is to have them introduced into the core sections of an extruded or molded article. For example, Prince et al. identified above describes how a fly-ash- and/or cinders-containing compound can be used in an extruded core section, which is full enclosed by a protective cladding, by manufacture using a co-extruder, to make a window shutter frame, louvers, or stiles or other elongated articles. Example 1 below proves successful injection molding of a core section.

EXAMPLES

Comparative Example A

A commercially available plastic article was molded in a two component mold having a core section of regrind/recycled polyolefins (a mixture of polypropylene and polyethylene resins) and other ingredients comprising 40 weight percent of the article and a capstock section of prime polypropylene, enveloping the core section, comprising 60 weight percent of the article. The injection molding machine was operated in accordance with standard operating conditions for the molding of that particular style and shape of that plastic article. The applicable cycle time measured from commencement of the injecting step to commencement of the ejecting step was 116.5 seconds.

Example 1

The same plastic article was molded in the same injection molding machine operated in accordance with the same operating conditions with the same capstock section but with a core section comprising 37 weight percent of a masterbatch of LLH 7506 Nano P.E.A.™ polymer enhancing agent from Revolutionary Plastics LLC and the remaining 63 weight percent of the same regrind/recycled polyolefins and the other ingredients as contained in the core section of Comparative Example A. Overall, the masterbatch comprised 14.8% of the entire plastic article. The applicable cycle time measured was 99.5 seconds, a startling 14.59 percent improvement over the cycle time of Comparative Example A.

The properties and appearance of the Example 1 plastic article were determined by the molder to be acceptable for commercial production and sale. In other words, to a skilled observer, no change in appearance or end-use properties was noticeable.

Achieving 14% reduction in cycle time is a major advantage for the molder over the competition still making the plastic articles according to the composition of Comparative Example A.

Considering the 14% improvement of applicable cycle time of Example 1 over Comparative Example A, over only 24 hours, 127 more plastic articles could be made, all other factors being equal. That greater productivity extrapolates into 889 more plastic articles per week, 3,810 per 30-day month, and 46,355 more per year.

In a commercial world where time is money and commercial production requires continuous improvement to remain competitive in a global economy, any reduction in cycle time without loss of physical properties is tremendous advantage to the molder who uses the masterbatch of the present invention containing functional filler of fly ash and/or cinders. Almost 15% of cycle time improvement is gigantic.

The invention is not limited to the above embodiments. The claims follow.

What is claimed is:

1. A method of using, a masterbatch comprising the steps of:
   (a) melt-mixing a masterbatch and a first thermoplastic resin to form a compound; and
   (b) extrusion, molding, or calendering the compound to form a plastic article,
   wherein the masterbatch has a weight percent in the plastic article ranging from about 1 to about 65 weight percent, and wherein the fly ash and/or cinders has a weight percent in the plastic article ranging from about 1 to about 58 weight percent;
   wherein the master latch comprises
   (i) fly ash and/or cinders comprising from about 72 to about 0.90 percent by weight of the masterbatch; and
   (ii) a second thermoplastic resin, compatible with or the same as the first thermoplastic resin, to serve as a carrier for the fly ash and/or cinders.

2. The method of claim 1, wherein the first thermoplastic resin and the second thermoplastic resin are selected from the group consisting of polyolefins, polyamides, polyesters, poly (meth)acrylates, polycarbonates, poly(vinyl halides), polyvinyl alcohols, polynitriles, polyacetals, polyimides, polyarylketones, polyetherketones, polyhydroxyalkanoates, polycaprolactones, polystyrenes, polyurethanes, polysulfones, polyphenylene oxides, polyphenylene sulfides, polyacetates, liquid crystal polymer fluoropolymers, ionomeric polymers, and copolymers of any of them and combinations of any two or more of them.

3. The method of claim 1, wherein the fly ash and/or cinders has a melting point or greater than about 1090° C.; a specific gravity of from about 2.2 to about 18; less than 100 parts per million of lead, hexavalent chromium, mercury or cadmium, a moisture content of 1% or less; a polycyclic aromatic hydrocarbon content, of less than about 200 parts per million; a crystalline silica content of below about 0.5%; and a particle size range in which about 85% of the particles fall within 0.2-280 µm, and remainder are less than about 850 µm.

4. The method of claim 1, wherein the masterbatch further comprises one or more of an adhesion promoter; a biocide, an anti-fogging agent; an anti-static agent; a bonding, blowing and/or foaming agent; a dispersant; afire and/or flame retardant; a smoke suppressant; an impact modifier; a lubricant; a mica; a pigment, colorant\s and/or dye; a plasticizer; a processing aid; a release agent; silane; titanate; zirconate; a slip and anti-blocking agent; a stabilizer; stearate; an ultraviolet light absorber; a viscosity regulator; and a wax.

5. The method of claim 1, wherein the fly ash and/or cinders comprises from about 75 to about $5 weight percent of the masterbatch.

6. The method of claim 3, wherein the fly ash and/or cinders comprises from about 75 to about $5 weight percent of the masterbatch.

7. The method of claim 1 wherein said fly ash and/or cinders are all sized to be less than about 850 microns and wherein said masterbatch mixed with said first thermoplastic resin to form a thermoplastic compound.

8. The method of claim 1, wherein step (b) comprises four substeps of:
   (1) injecting the compound into a mold;
   (2) holding the compound in the mold to form the plastic article in the shape of the mold;
   (3) cooling the plastic article to permit the plastic article to be released from the mold white retaining shape of the mold; and
   (4) ejecting the plastic article,
   wherein time between commencement of the injecting substep (1) and commencement of the ejecting substep (4) is one cycle time, and
   wherein the cycle time of the compound is reduced from about 5 percent to about 30 percent for a plastic article of the compound as compared with a cycle time between commencement of injecting substep (I) and commencement of ejecting substep (4) for a plastic article of the first thermoplastic resin.

9. The method of claim 8, wherein the first thermoplastic resin comprises polyethylene and the second thermoplastic resin comprises polyethylene, and wherein the cycle time of the compound is about 14 percent faster than the cycle time of the first thermoplastic resin.

10. The method of claim 8, wherein the plastic article is a core section about which a capstock section is also molded.

11. A method of making a plastic article comprising
    (a) forming a masterbatch for combining with a first thermoplastic resin, said masterbatch having:
       fly ash and/or cinders comprising from about 72 to about 90 percent by weight of the masterbatch; and
       a second thermoplastic resin to serve as a carrier for the fly ash and/or cinders;
    (b) melt-mixing the masterbatch and the first thermoplastic resin to form a thermoplastic compound:
    (c) providing a shaping machine to produce a plastic article, said shaping machine being configured to operate in a cycle that extends in time for a cycle time as the machine moves between a forming condition in which the thermoplastic compound is introduced and the plastic article formed and a removing condition in which the plastic article is removed; and
    (d) introducing said thermoplastic compound into said shaping machine and operating said shaping machine in a cycle at
       a first cycle time to form said plastic article, said first cycle time being faster than a second cycle time which is when said shaping machine is operated to produce a different plastic article wherein said thermoplastic compound is a resin without master batch;
    wherein the masterbatch has a weight percent in the plastic article ranging from about 1 to about 65 weight percent, and wherein the fly ash and/or cinders has a weight percent in the plastic article ranging from about 1 to about 58 weight.

12. The method of claim 11 wherein the first thermoplastic resin is polyethylene and wherein said first cycle time is about 14 percent faster than said second cycle time; and wherein said fly ash and/or cinders are less than about 850 microns in particle size.

* * * * *

UNITED STATES PATENT AND TRADEMARK OFFICE
CERTIFICATE OF CORRECTION

PATENT NO. : 9,290,645 B2  
APPLICATION NO. : 14/002629  
DATED : March 22, 2016  
INVENTOR(S) : Jack R. Prince and Jason D. Piunti Page 1 of 2

It is certified that error appears in the above-identified patent and that said Letters Patent is hereby corrected as shown below:

Claims

Column 7, line 8, claim 1, "A method of using, a" should be -- A method of using a --

Column 7, line 19, claim 1, "wherein the master latch comprises" should be -- wherein the masterbatch comprises --

Column 7, line 21, claim 1, "from about 72 to about 0.90 percent" should be -- from about 72 to about 90 percent --

Column 7, line 33, claim 2, "liquid crystal polymer" should be -- liquid crystal polymers, --

Column 7, line 37, claim 3, "a melting point or greater" should be -- a melting point of greater --

Column 7, line 38, claim 3, "from about 2.2 to about 18" should be -- from about 2.2 to about 2.8 --

Column 7, line 41, claim 3, "content, of less" should be -- content of less --

Column 7, line 44, claim 3, "0.2-280 μm, and remainder" should be -- 0.2 μm - 280 μm, and the remainder --

Column 7, line 49, claim 4, "afire and/or flame" should be -- a fire and/or flame --

Column 7, line 51, claim 4, "colorant\s and/or dye" should be -- colorants and/or dye --

Column 7, line 56, claim 5, "about 75 to about $5" should be -- about 75 to about 85 --

Signed and Sealed this  
Seventeenth Day of May, 2016

Michelle K. Lee  
*Director of the United States Patent and Trademark Office*

Column 7, line 59, claim 6, "about 75 to about $5" should be -- about 75 to about 85 --

Column 8, line 1, claim 7, "masterbatch mixed" should be -- masterbatch is mixed --